United States Patent [19]

Matsui et al.

[11] 4,421,292
[45] Dec. 20, 1983

[54] AIR-OPERATED OIL PRESSURE CONTROL VALVE

[75] Inventors: Takahiro Matsui, Uji; Jun Tamura, Yahata, both of Japan

[73] Assignee: Kabushiki Kaisha Morita Seisakusho, Kyoto, Japan

[21] Appl. No.: 249,387

[22] Filed: Mar. 31, 1981

[30] Foreign Application Priority Data

Jun. 18, 1980 [JP] Japan .............................. 55-85337[U]

[51] Int. Cl.³ ........................................... F16K 31/124
[52] U.S. Cl. ..................... 251/60; 251/63.4; 251/63.6
[58] Field of Search ................ 251/63.4, 63.6, 285, 251/63.5, 60

[56] References Cited

U.S. PATENT DOCUMENTS

| | | | |
|---|---|---|---|
| 1,406,026 | 2/1922 | Jensenius | 251/63.4 X |
| 2,663,153 | 12/1953 | Grant, Jr. | 251/63.4 X |
| 2,908,477 | 10/1959 | Buri | 251/285 X |
| 3,029,061 | 4/1962 | Hoxworth | 251/63.4 |
| 3,114,387 | 12/1963 | Barkan et al. | 251/63.4 X |

FOREIGN PATENT DOCUMENTS

| | | | |
|---|---|---|---|
| 1120387 | 4/1956 | France | 251/63.6 |
| 399103 | 3/1966 | Sweden | 251/63.6 |

*Primary Examiner*—Arnold Rosenthal
*Attorney, Agent, or Firm*—Koda and Androlia

[57] ABSTRACT

An air operated oil pressure control valve wherein the inlet port and the outlet port for oil are provided in the valve body at a position wherein they face each other with a normally closed valve port located in between. When compressed air is introduced into the valve body, the valve port is opened, allowing the oil pressure to pass through the valve.

2 Claims, 3 Drawing Figures

AIR-OPERATED OIL PRESSURE CONTROL VALVE

BACKGROUND OF THE INVENTION

1. Field of the Invention

This invention relates to an oil pressure control valve operated by compressed air.

2. Prior Art

In the conventional dental treatment bed, for instance, the mechanism to vertically move the seat of the bed and that to tilt the back-rest forward and backward from the seat have all been operated with oil pressure. However, those employing a solenoid control valve in the oil pressure circuit for on-off control were limited to a relatively low control oil pressure, about 10 kg/cm$^2$, and also, while the transformer was indispensable for securing the solenoid operating voltage, it frequently burnt out due to continuous use for many hours. Besides, the electrical cost was proportionally high. Because of the problems presented as mentioned above, the advent of non-electric power control type model for substituting for the solenoid type has been awaited. Also, because the compressed air-operated type parts, such as handpiece instrument, are installed in the treatment table as inseparable components, there has been another expectation attached to it that it would be doubly advantageous if the oil pressure control could be made by applying the aforementioned compressed air.

SUMMARY OF THE INVENTION

Accordingly, it is an object of the present invention to provide an air-operated pressure control valve which is applicable even in a high pressure oil circuit without employing a solenoid.

In keeping with the principles of the present invention, the objects are accomplished by a unique air-operated oil pressure control valve wherein the inlet port and the discharge port for oil are provided in the valve body, at the position to face each other with valve port located in between, and usually said valve port is closed with a valve stopper, but it is arranged that by introducing the compressed air to inside of the valve body, the closure with said valve stopper is released, allowing the oil pressure to pass through. It is characteristic in that, while in the conventional solenoid oil release valve, the maximum on-off control which could be applied is only about 10 kg/cm$^2$ at maximum, the present invention is applicable even to about 55 kg/cm$^2$ in duct hydraulic pressure. Also, the electric power required for solenoid operation can be saved. Furthermore, it is possible to eliminate the transformer needed for securing the solenoid operating voltage.

BRIEF DESCRIPTION OF THE DRAWINGS

The above-mentioned and other features and objects of the present invention will become more apparent with reference to the following description taken in conjunction with the accompanying drawings wherein like reference numerals denote like elements, and in which.

DETAILED DESCRIPTION OF THE INVENTION

Figure 1:
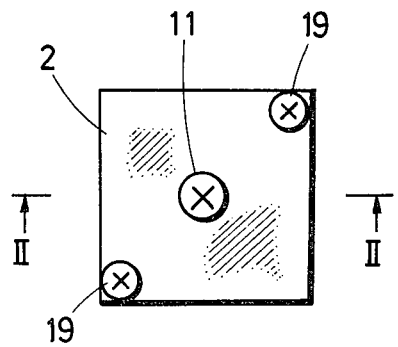
FIG. 1 is a plan view of pneumatic oil control valve in accordance with the teachings of the present invention.

Referring more particularly to the drawings, the present invention includes a valve body 1, a cover 2 fixed to the valve body 1, a piston slidably provided between the valve body 1 and the cover 2, a valve rod 4 integrally fixed to piston 3, a valve stopper 6 fixed to the valve rod 4 which freely opens and closes the valve port 5 provided inside of the valve body 1 and an oil inlet port 7 and oil outlet 8 provided in the valve body 1 which are opened to the valve port 5 respectively. The present invention further includes an air inlet port 9 provided in the cover 2 which lets compressed air act on the pistons 3 and spring 10 for constantly biasing the piston in a direction reversed to the operating direction of the compressed air. Also, the present invention includes a regulator 11 which controls the vertical stroke of the valve rod 4. The regulator 11 functions, when the compressed air is absent, to block the oil inlet port 7 and oil outlet port 8 by closing the valve port 5 with the valve stopper 6 by means of the biasing action of spring 10; however, when compressed air is introduced into the air inlet port 9 to move the piston 3 in a direction to release the closure of the valve port 5 against the biasing action of the spring 10, the passage between the oil inlet port 7 and the oil outlet port 8 is opened.

Shown in FIG. 1 is one example wherein the valve rod 4 is provided with another valve rod 41 provided approximately coaxially with the valve rod 4 and arranged to butt against the valve rod 4. On the valve rod 41 a valve stopper 6 is provided and the valve rod 41 is provided with another spring 12 that is constantly biased in a direction to move the valve stopper 6 towards the direction to close the valve port 5 in cooperation with the spring 10. However, if the valve rods 4 and 41 are of a single unified body and the valve closing force, as well as the restoring elastic force of the valve stopper 6, can be sufficiently provided by a single spring 10, it is not necessary to subdivide the valve rod into two valve rods 4 and 41 as is shown in this example. Furthermore, a screw is screwed in the top part of the valve rod 4 as an oil regulator 11. The screw 11 is provided with a screw head 110 which is provided at the top portion 24 of the cover 2. When the screw 11 is tightened, the distance between the screw head 110 and the top part 24 decreases and the stroke of the valve rod 41 becomes shorter, resulting in a decrease in the opening of the valve port 5 by means of the valve stopper 6 and only a small amount of oil is allowed to pass through. On the contrary, when the screw 11 is loosened, the opening of the valve port 5 is increased allowing a large amount of oil to pass therethrough.

The reference numeral 13 illustrates a stopper screwed into the bottom part of the valve body 1 and the valve rod 41 moves up and down in the stopper 13 against and with the biasing action of spring 12. An O-ring 14 for sealing the oil pressure side and the atmospheric side is provided and a second O-ring 15 provided on the valve rod 4 is provided to seal the compressed air side and oil pressure side. A third O-ring 16 is similarly mounted on the valve rod 4 for sealing the compressed air side and the atmospheric side. A fourth O-ring 17 seals the compressed air side and the atmospheric side and is provided at the joint between the cover 24 and the valve body 2.

A packing 18 is provided for the piston 3 and screw 19 is provided for connecting together the cover 2 and the valve body 1. The valve body 1 and cover 2 are further provided with a piston chamber 21, an air vent 22 for maintaining the inside of the chamber 21 at atmospheric pressure and pocket 23 provided on the upper surface of the piston 3 which is activated by the operation of compressed air.

In operation, when the compressed air is absent, the piston 3 is kept at the top dead point by the spring 10 and the valve stopper 6 installed on the valve rod 41 is kept in a condition to close the valve port 5 by means of the spring 12. When this occurs, the oil inlet port 7 and the oil outlet port 8 are closed and oil cannot move therethrough (see FIG. 2).

Figure 3:
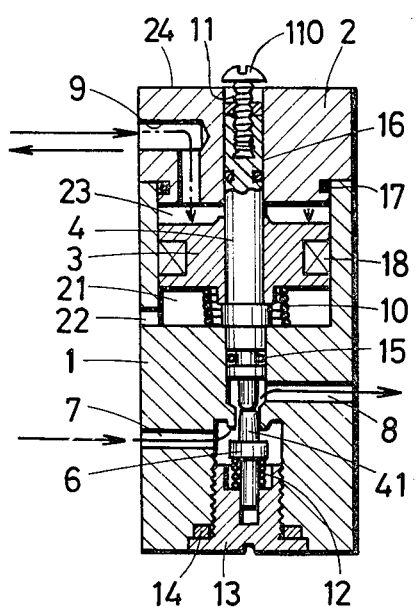
FIG. 3 is a sectional view taken along the line II—II of FIG. 1 showing the opened state of the valve.

When compressed air is applied to air inlet port 9 from an air source 20 (connected to an air supply source of an airhandpiece), the compressed air acts on the pocket 23 on the upper surface of the piston 3 to push down the piston against the elastic force of the springs 10 and 12 to thereby cause the valve stopper 6 to move in a direction to open the valve port 5 (a downward direction in the figures). The valve rods 4 and 41 move downward until the head 110 of the regulator screw 11 and the top part 24 of the cover 2 are engaged. As a result, the valve port 5 is opened and oil is pressure fed from the oil inlet port 7 through the oil outlet port 8. As was described above, the amount of opening of the valve port 5 can be adjusted by the regulator screw 11 (as is shown in FIG. 3).

Figure 2:
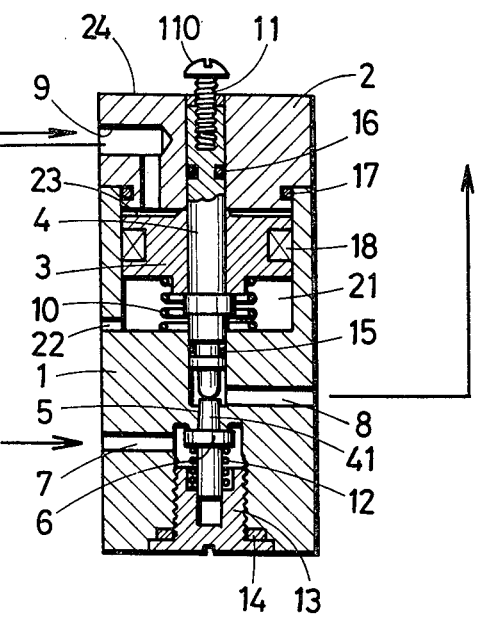
FIG. 2 is a sectional view taken along the line II—II of FIG. 1.

When the supply of compressed air is cut off, the valve stopper 6 again closes the valve port 5 by the biasing force of the springs 10 and 12, as is shown in FIG. 2, and the passage between the oil inlet port 7 and the oil outlet port 8 is blocked. In this case, the air in the piston chamber 21 is bent back from the air inlet port 9, and at the same time, the rest of the air is led out to the atmosphere or open air. Thereafter, the inside of the chamber 21 is maintained at an atmospheric pressure.

In the above, when the elastic force of the compressed air and springs 10 and 12, the diameter of valve stopper 6, the opening diameter of the valve port 5, etc. are designed appropriately, reliable on-off control can be made even for oil pressures higher than that of the commercial solenoid valve. For example, the present invention is applicable for systems having oil pressure having 55 kg/cm$^2$ and therefore can control oil pressure five times greater than that of a conventional type (about 10 kg/cm$^2$).

It should be apparent from the explanation given above, by using the present invention, the oil pressure can be controlled with air pressure. Therefore, when compared with a known solenoid valve, the present invention offers certain advantages as follows: (i) it contributes to a savings of electrical power; (ii) it eliminates the worry of burning out a transformer; (iii) it enables the control of higher oil pressures; (iv) it is more reliable; and (v) it is easier to manipulate.

It should be apparent to those skilled in the art that the above described embodiment is merely illustrative of but one of many possible specific embodiments which represent the applications of the principles of the present invention. Numerous and varied other arrangements can be readily devised by those skilled in the art without departing from the spirit and scope of the present invention.

We claim:

1. An air operated oil pressure control valve for a dental treatment bed comprising:

a valve body;

a cover fixed to said valve body;

a piston slidably provided between the valve body and the valve cover;

a first valve rod fixed to said piston;

a valve stopper operated by said first valve rod which freely opens and closes a valve port provided inside of the valve body;

an oil inlet port and an oil outlet port which respectively are opened by said valve port and are provided in said valve body;

an air inlet port provided in said cover to allow compressed air to act on said piston;

a spring for biasing said piston in a direction reversed to the action of said compressed air;

a regulator means for controlling the vertical stroke of said first valve rod;

a second valve rod provided in said valve body to butt against said first valve rod;

a second valve stopper provided on said second valve rod; and a second spring provided on said second valve rod for biasing said second valve stopper in a direction to close said valve port;

whereby said valve port closes said oil inlet port and said oil outlet port when compressed air is not applied to said pressure control valve and said oil inlet port and oil outlet port are opened by the opening of said valve port when compressed air is applied so that oil may pass between said oil inlet port and said oil outlet port.

2. A control valve according to claim 1 wherein said regulator is a screw screwed into a top portion of said first valve rod and a screw head of said screw engages with a top portion of said valve cover when said valve port is opened by said compressed air and the amount of opening of said valve port can be adjusted by tightening and loosening said screw so as to adjust the distance between said screw head and said top portion of said valve cover.

* * * * *